United States Patent
Peeters

(10) Patent No.: US 12,189,754 B2
(45) Date of Patent: Jan. 7, 2025

(54) AUTHENTICATION METHOD AND DEVICE

(71) Applicant: Proton World International N.V., Diegem (BE)

(72) Inventor: Michael Peeters, Tourinnes-la-Grosse (BE)

(73) Assignee: STMicroelectronics Belgium, Diegem (BE)

(*) Notice: Subject to any disclaimer, the term of this patent is extended or adjusted under 35 U.S.C. 154(b) by 215 days.

(21) Appl. No.: 17/654,167

(22) Filed: Mar. 9, 2022

(65) Prior Publication Data
US 2022/0327194 A1     Oct. 13, 2022

(30) Foreign Application Priority Data
Apr. 8, 2021  (FR) ...................... 2103602

(51) Int. Cl.
*H04L 9/16*     (2006.01)
*G06F 21/44*    (2013.01)
*H04L 9/08*     (2006.01)
*H04L 9/32*     (2006.01)
*H04L 9/40*     (2022.01)

(52) U.S. Cl.
CPC ............ *G06F 21/44* (2013.01); *H04L 9/0866* (2013.01); *H04L 9/16* (2013.01); *H04L 9/3271* (2013.01); *H04L 63/0428* (2013.01); *H04L 63/08* (2013.01); *H04L 63/0876* (2013.01)

(58) Field of Classification Search
CPC ..... G06F 21/44; H04L 63/0428; H04L 63/08; H04L 9/0866; H04L 9/0876; H04L 9/16; H04L 9/3271
See application file for complete search history.

(56) References Cited

U.S. PATENT DOCUMENTS

| | | | |
|---|---|---|---|
| 5,241,598 A | 8/1993 | Raith | |
| 7,363,492 B2* | 4/2008 | Kuhlman | ............... H04L 9/3221 |
| | | | 713/168 |
| 2005/0188200 A1 | 8/2005 | Kwok | |
| 2007/0094505 A1 | 4/2007 | Futa et al. | |
| 2009/0135725 A1 | 5/2009 | Tanaka et al. | |

(Continued)

FOREIGN PATENT DOCUMENTS

| | | |
|---|---|---|
| CN | 1665181 A | 9/2005 |
| CN | 1788453 A | 6/2006 |

(Continued)

OTHER PUBLICATIONS

"Zero Knowledge Authentication"—Rob Leslie, Sedicii, Jul. 30, 2015 https://sedicii.com/news/Zero-Knowledge-Authentication/ (Year: 2015).*

(Continued)

*Primary Examiner* — Randy A Scott
(74) *Attorney, Agent, or Firm* — Slater Matsil, LLP

(57) ABSTRACT

The present disclosure relates to authenticating a first device to a second device, including at least two successive verification operations comprising the following successive steps. The second device generates a first data, and sends the first data to the first device. The first device generates a third data and a fourth data used by the following verification operation and sends the third data to the second device. The second device checks the third data indicating whether the check was successful or not.

20 Claims, 6 Drawing Sheets

(56) References Cited

U.S. PATENT DOCUMENTS

| | | | |
|---|---|---|---|
| 2011/0276844 | A1 | 11/2011 | Potter et al. |
| 2012/0143830 | A1* | 6/2012 | Cormode .......... G06F 16/24568 |
| | | | 707/687 |
| 2013/0279697 | A1 | 10/2013 | Garcia Morchon et al. |
| 2015/0278506 | A1* | 10/2015 | Jun .................. G06F 21/44 |
| | | | 726/6 |
| 2018/0152305 | A1 | 5/2018 | Jacquin et al. |
| 2018/0352433 | A1* | 12/2018 | Vendelbo .............. H04W 12/50 |
| 2020/0272724 | A1* | 8/2020 | Peeters ................ G06F 21/445 |

FOREIGN PATENT DOCUMENTS

| | | |
|---|---|---|
| CN | 101123501 A | 2/2008 |
| CN | 101317426 A | 12/2008 |
| CN | 103003799 A | 3/2013 |
| CN | 107534551 A | 1/2018 |
| CN | 109309689 A | 2/2019 |

OTHER PUBLICATIONS

"Secure Comparator: a ZKP-Based Authentication System"—Korchagin et al., Cossacklabs, Mar. 2015 https://www.cossacklabs.com/files/secure-comparator-paper-rev12.pdf (Year: 2015).*

* cited by examiner

AUTHENTICATION METHOD AND DEVICE

CROSS-REFERENCE TO RELATED APPLICATIONS

This application claims the benefit of French Patent Application No. 2103602, filed on Apr. 8, 2021, which application is hereby incorporated herein by reference.

TECHNICAL FIELD

The present disclosure relates to electronic devices or circuits in general. More particularly, the present disclosure applies to authentication between two electronic devices or circuits preceding a method of communication between these two devices or circuits, for example.

BACKGROUND

Communication between two electronic devices or circuits is often preceded by an authentication phase. During this phase, an authentication method, implemented by the two devices, verifies whether the two devices are authorized to communicate with each other.

Authentication methods are often used in communications between a terminal-type device such as a computer, printer or payment terminal, and peripheral-type electronic equipment or a device, such as a consumable or an accessory. In this case, the authentication method enables the peripheral-type device's access to the terminal-type device's data and/or functionalities to be validated. The authentication method is a primary means of protection against malicious devices attempting to access the data and/or functionality of other devices.

A common example of an authentication method used between a computer and a user, for example, is the use of a user ID and password.

It would be desirable to be able to improve the known authentication methods for electronic devices, at least in part.

SUMMARY

There is a need for more reliable authentication methods.

In particular, there is a need for more reliable Verifier/Prover authentication methods.

One embodiment addresses all or some of the drawbacks of known authentication methods, and in particular some or all of the drawbacks of known Verifier/Prover authentication methods.

One embodiment provides an authentication method of a first device to a second device, comprising at least two successive verification operations, each operation comprising the following successive steps: the second device generates first data from a second data generated in the preceding verification operation, and sends the first data to the first device; the first device generates third and fourth data used by the following verification operation, by applying a first function taking as input at least the first and fourth data generated in the preceding verification operation, and sends the third data to the second device; and the second device verifies the third data using a second function taking as input the first and third data and outputting information, indicating whether the verification was successful or not, and the second data used by the following verification operation. The first device is authenticated to the second device if, for each verification operation, the information indicates that the verification was successful, and if the fourth data of the first device and the second data of the second device of the last verification operation are correct.

According to one embodiment, during implementation of the first verification operation, the second device uses fifth data to generate the first data, and the first device uses sixth data to generate the third and fourth data.

According to one embodiment, the fifth data is different for each verification operation, and the sixth data is different for each verification operation.

According to one embodiment, during implementation of each verification operation, the second device uses the fifth data to generate the first data, and the first device uses the sixth data to generate the third and fourth data.

According to one embodiment, the second device generates the first data from the second data generated at the previous verification operation and the fifth data, and the first function takes as input the first data, the fourth data generated at the previous verification operation, and the sixth data.

According to one embodiment, the method further comprises an identification operation preceding the at least two verification operations, wherein the first and second devices exchange identification numbers, if each first, second device recognizes the identification number of the other device then the at least two verification operations are not implemented, and the first device is authenticated to the second device, otherwise the at least two verification operations are implemented.

According to one embodiment, at least a first function of the at least two verification operations is different from at least a first function of another of the at least two verification operations.

According to one embodiment, at least a second function of the at least two verification operations is different from at least a second function of another of the at least two verification operations.

According to one embodiment, the first and second devices send data to each other in an encrypted manner.

According to one embodiment, during implementation of each of the at least two verification operations, the first and second devices send data to each other in an encrypted manner using a first encryption key.

According to one embodiment, the first encryption key is different for each implementation of each of the at least two verification operations.

According to one embodiment, the first encryption key depends on the first encryption key of the previous verification operations.

According to one embodiment, of the at least two verification operations, there is at least a first verification operation in which the application of the second function further generates seventh data that is sent to the second device, and of the at least two verification operations there is at least a second verification operation, successive to the first verification operation. The second device further generates eighth data by applying the first function to the seventh data and sends the eighth data to the first device, and the first device decrypts ninth data using the eighth data to generate the third data.

In one embodiment, the first device uses the eighth data to decrypt ninth data, and the first function further takes as input the ninth data to generate the third data.

Another embodiment provides a device adapted to implement the above-described method as the first device.

According to one embodiment, the device comprising memory in which data showing the first, second, third and fourth data and information is stored.

Still another embodiment provides a device adapted to implement the above-described method as a second device.

According to one embodiment, the device comprises a memory in which data showing the first, second, third and fourth data and the information is stored.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various Figures. In particular, the structural and/or functional features that are common of the various embodiments may have the same references and may dispose identical structural, dimensional and material properties.

For the sake of clarity, only the operations and elements that are useful for an understanding of the embodiments described herein have been illustrated and described in detail. In particular, this authentication method can be adapted to the usual communication processes.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the Figures.

Unless specified otherwise, the expressions "around", "approximately", "substantially" and "in the order of" signify within 10%, and preferably within 5%.

Figure 1:
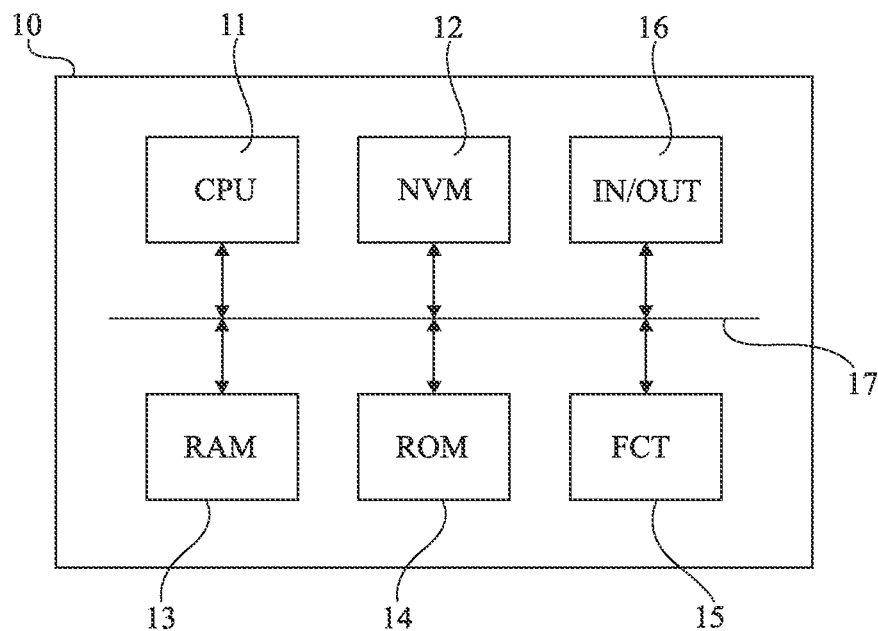
FIG. 1 shows, schematically and in block form, an electronic device to which the embodiments described below can be applied.

FIG. 1 shows, schematically and in block form, an example architecture of an electronic device 10.

The electronic device 10 comprises a processor 11 (CPU) adapted to implement various instructions to process data stored in the memories of and/or provided by other circuitry to the device 10.

The electronic device 10 further comprises different types of memories, including non-volatile memory 12 (NVM), volatile memory 13 (RAM), and/or read-only memory 14 (ROM). Each memory is adapted to store different types of data. According to one embodiment, the device 10 may have one or more of these different types of memories, and/or have memories of only one or two of these types.

The electronic device 10 further comprises different circuits 15 (FCT) adapted to perform different functions. By way of example, the circuits 15 may comprise measurement circuits, data conversion circuits, encryption circuits, etc.

The electronic device 10 may further comprise interface circuits 16 (IN/OUT) adapted to send and/or receive data from outside the device 10. The interface circuitry 16 may be further adapted to implement a data display such as a display screen. The electronic device 10 is further particularly adapted to communicate with other electronic devices, and to implement an authentication method to authorize such communication.

The electronic device 10 further comprises one or more data buses 17 adapted to transfer data between its various components. In particular, the bus 17 is used to transfer data stored in the memories 12 to 14 to the processor 11, circuits 15 and/or interface circuits 16.

Figure 2:
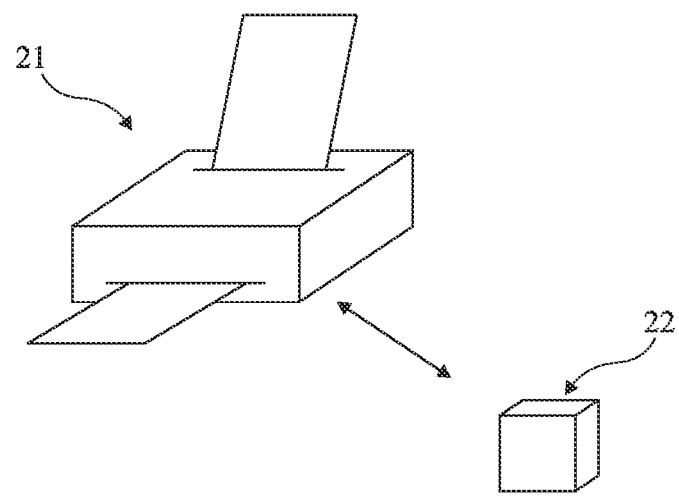
FIG. 2 shows, schematically, two electronic devices to which the embodiments described below may be applied.

FIG. 2 shows communication, schematically and in block form, between two devices 21 and 22 of the type of device 10 described in connection with FIG. 1.

The devices 21 and 22 are devices of the type of device 10 described in connection with FIG. 1. The device 21 is a terminal-type device. In FIG. 2, the device 21 is a printer, for example. The device 22 is a peripheral-type device, and more particularly device 22 is a consumable, adapted to be used by device 21. In FIG. 2, the device 22 is, an ink cartridge, for example, adapted to be used by device 21.

Upon installation of the device 22 in the device 21, the devices 21 and 22 implement an authentication method to verify that they are authorized to be used together. According to one example, this authentication method may verify the hardware and/or software compatibility of the devices 21 and 22. According to another example, this authentication method may be able to prevent a malicious device from accessing secret data stored in the devices 21 and 22.

An example of implementation and of authentication method embodiments are described in connection with FIGS. 3 through 7.

Figure 3:
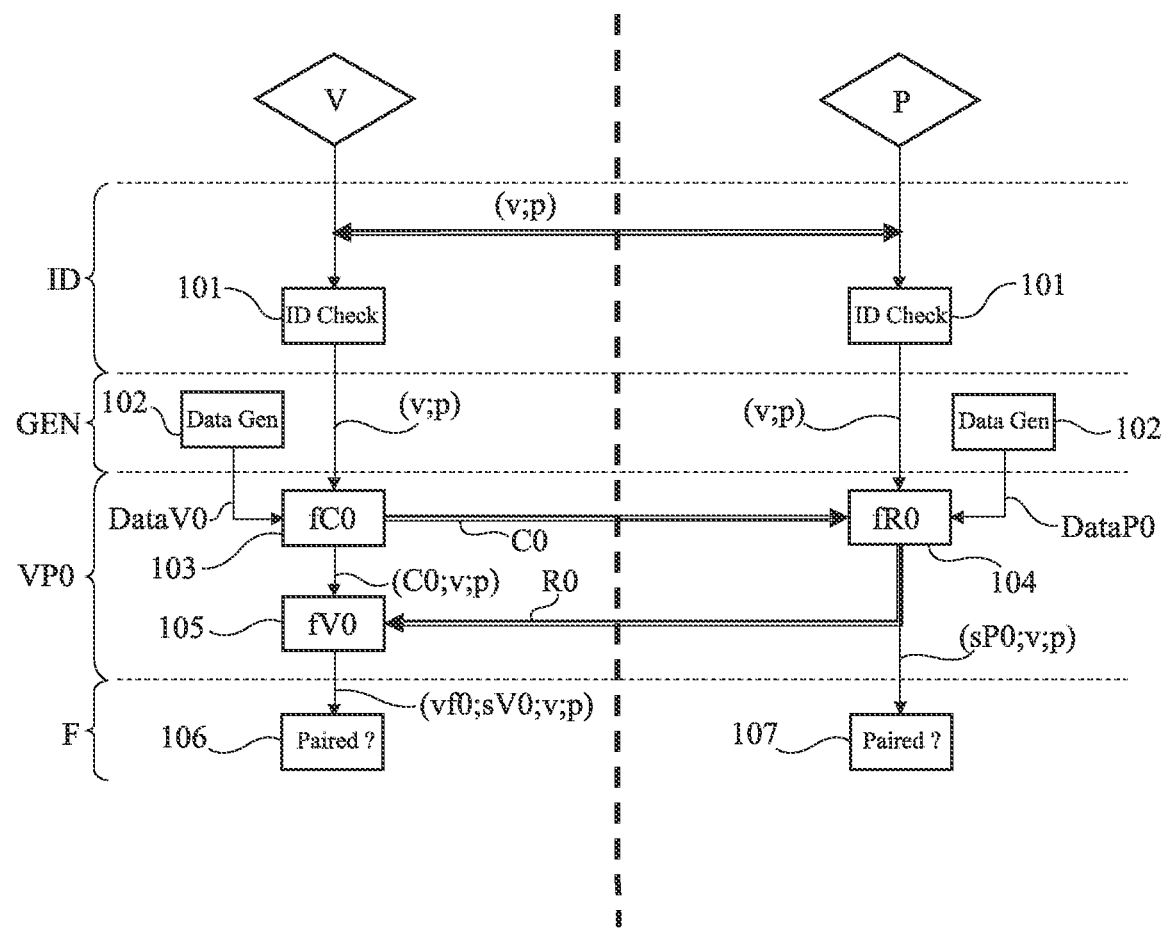
FIG. 3 shows, schematically and in block form, an example of an authentication method.

FIG. 3 illustrates, schematically and in block form, an example embodiment of a method for authenticating a device P of the type of device 22 described in connection with FIG. 2 with an electronic device V of the type of device 21 described in connection with FIG. 2.

The example described herein is a Verifier/Prover type of authentication method in which a verifier device, in this case the V device, sends data to the prover device, in this case the P device, for it to apply a transformation to it. The prover device then sends the result of the transformation back to the verifier device for verification. If the result of the verification is correct then the prover device is authenticated to the verifier device. The example authentication method is described in more detail below.

FIG. 3 is split in two, lengthwise, by a dotted line; the left side of FIG. 3 relates to the device V, and the right side of FIG. 3 relates to the device P.

The authentication method may begin with an optional ID operation, during which the devices V and P exchange identification information. In effect, the devices V and P each have single or multiple identification information, such as at least single identification information v for the device V, and at least single identification information p for the device P. According to one example, the information v and p are binary words representing identification numbers.

Each device V, P then implements a function 101 ("ID Check" block) that allows them to know if they have already communicated with the other device P, V based on the received identification information p, v. According to one example, the function 101 is a search function in a memory space storing the identification information of all the electronic devices with the device V or P has already communicated, i.e. the electronic devices with which the authentication method has already been successfully implemented. According to one example, this memory space may be emptied on a regular basis. If the function 101 indicates that the devices V and P have already communicated with each other recently, the devices V and P may not implement the authentication method and start communicating (not shown in FIG. 3). However, if the function 101 indicates that the devices V and P have never communicated with each other, then the rest of the authentication method is implemented.

The authentication method further comprises a GEN operation, following the identification operation, during which the devices V and P use a same function 102 ("Data Gen" block) to generate a DataVo and a DataPo data respectively. The devices V and P do not communicate with each other to generate the data DataVo and DataPo. According to one embodiment, if the devices V and P are intended to communicate with each other, then they are adapted to generate data DataVo and DataPo that are identical or affiliated with each other. According to one example, if the authentication method uses a symmetric encryption key as the data DataVo and DataPo, the data DataVo and DataPo are identical. However, if the authentication method uses an asymmetric encryption key as the data DataVo and DataPo, the data DataVo and DataPo are not identical but are affiliated with each other. The function 102 may be a function for searching the data DataVo and DataPo in memory spaces of the devices V and P.

The GEN operation is directly followed by a VPo verification operation, during which the devices V and P exchange transformed data. The VPo operation comprises the following steps: the device V implements a function 103 (block "fCo"), taking as input the data DataVo and, optionally, the identification information v and p, to generate a data Co; the device V sends the data Co to the device P; the device P implements a function 104 (block "fRo"), taking as input the data Co and the data DataPo and, optionally, the identification information v and p, to generate data Ro and secret data sPo; the device P sends the data Ro to the device V; and the device V implements a function 105 (block "fVo"), taking as input the data Co and Ro and, optionally, the identification information v and p, and the data DataVo, to generate result data vfo and secret data sVo.

The verification operation VPo is followed by a final operation F, during which the devices V and P decide whether they can communicate with each other. In this operation, the device V implements a function 106 ("Paired?" block), taking as input the identification data v and p, the result data vfo and the secret data sVo. The device P implements a function 107 ("Paired?" block), taking as input the identification data v and p, and the secret data sPo. The object of the function 106 is to verify the result data vfo and the secret data sVo. The object of the function 107 is to verify the secret data sPo. In addition, and optionally, the functions 106 and 107 can use the identification information v and p. If the functions 106 and 107 consider the verifications successful, then the devices V and P can communicate with each other, their identification information can be registered. Otherwise, no communication starts between devices V and P.

Figure 4:
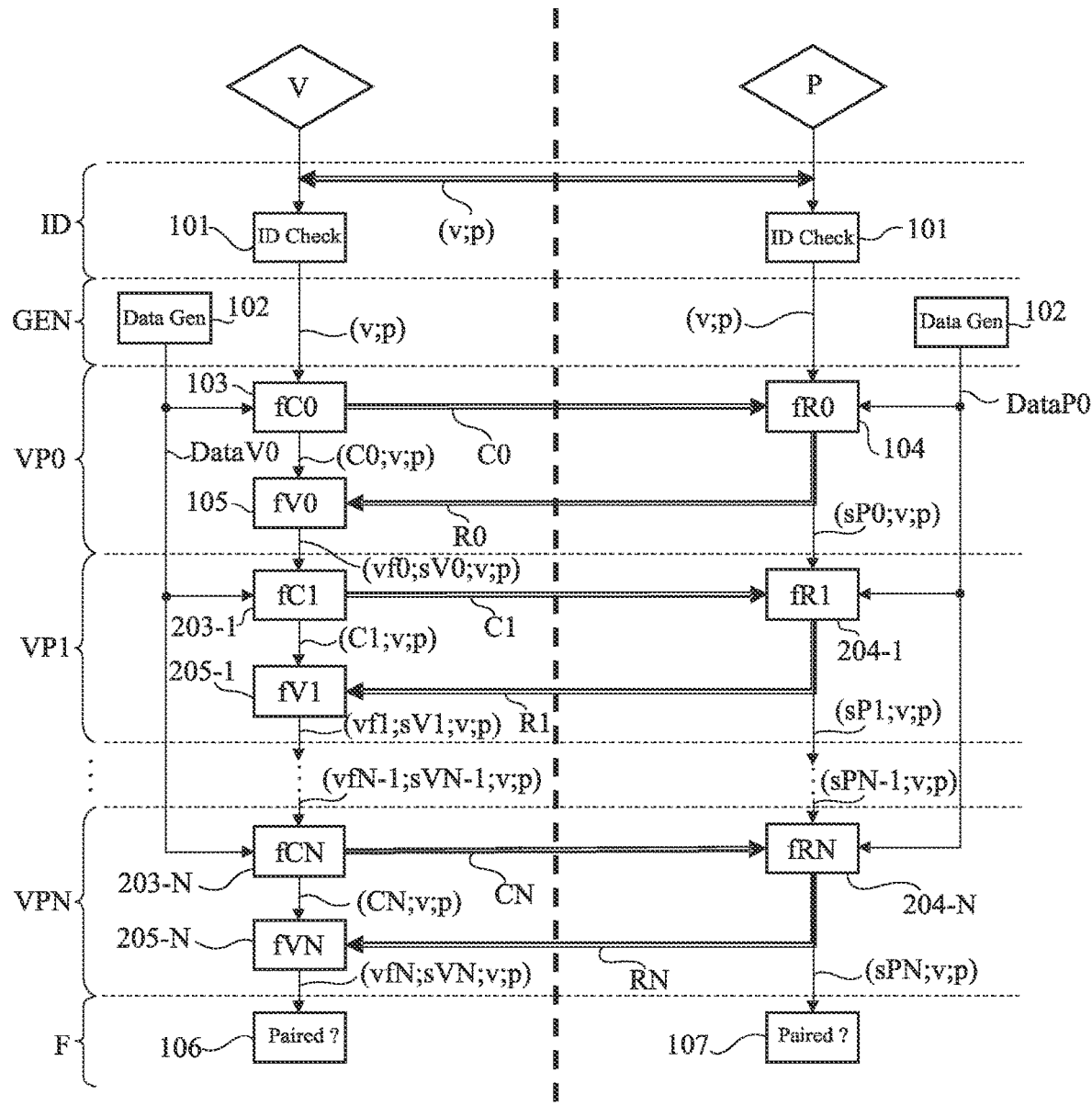
FIG. 4 shows, schematically and in block form, an embodiment of an authentication method.

FIG. 4 illustrates, schematically and in block form, an embodiment of a device authentication method of the type of device 22 described in connection with FIG. 2 to an electronic device of the type of device 21 described in connection with FIG. 2.

The method of FIG. 4 contains elements in common with the method described in connection with FIG. 3. The common elements are not described again, and only the differences between the methods in FIGS. 3 and 4 are highlighted.

Like the method in FIG. 3, the method in FIG. 4 comprises the following successive operations: the ID operation, during which the devices V and P exchange their identification information v and p, and implement the function 101 to check whether they have not already been authenticated to each other; the GEN operation, during which the devices V and P implement the function 102 to generate the data DataVo and DataPo; the verification operation VPo, during which the devices V and P implement the functions 103, 104 and 105, to generate and/or exchange the data Co, Ro, sVo, sPo and vfo; and the operation F, during which the devices V and P implement the functions 106 and 107, to conclude whether they can communicate with each other or not.

Unlike the method of FIG. 3, the method of FIG. 4 does not include a single verification operation VPo, but includes N+1 successive verification operations VP0, VP1, . . . , VPN, where N is a natural number greater than 1.

Each operation VPi, with i being a natural number varying from 1 to N, is similar to the verification operation VPo described in relation to FIG. 3, and comprises the following successive steps: the device V implements a function 203-$i$ (block "fCi"), similar to the function 103, taking as input the data DataVo, optionally the identification information v and p, and the secret data sVi−1 of the preceding verification operation VPi−1, to generate data Ci; the device V sends the data Ci to the device P; the device V implements a function 204-$i$ (block "fRi"), similar to the function 104, taking as input the data Ci and the data DataPo, optionally the identification information v and p, and the secret data sPi−1 from the preceding verification operation VPi−1, to generate data Ri and secret data sPi; the device P sends the data Ri to the device V; and the device V implements a function 205-$i$ (block "fVi"), similar to the function 105, taking as input the data Ci and Ri, optionally the identification information v and p, and the secret data sVi−1, to generate a result data vfi and a secret data sVi.

According to one embodiment, the functions 103, 203-1, . . . , 203-N are data generation functions such as random data generation functions. According to one example, the functions 103, 203-1, . . . , 203-N may additionally be encryption functions, for example, using the data DataVo as an encryption key to encrypt a random data. According to one variant, the functions 103, 203-1, . . . , 203-N are functions that fetch data from the memories of the devices V and P. According to another embodiment, the functions 103, 203-1, . . . , 203-N may also be verification functions to validate that the data received from the previous verification operation, the functions 103, 203-1, . . . , 203-N in this case are, for example, signature functions.

According to one embodiment, the functions 104, 204-1, . . . , 204-N are encryption functions such as permutations, using the data DataPo as the encryption key. According to another example, the functions 104, 204-1, . . . , 204-N are signature functions.

According to one embodiment, the functions 105, 205-1, ..., 205-N provide data vfo, ..., vfN as output showing the result of a comparison of the data Co, ..., CN with the corresponding data Ro, ..., RN. The data vfo, ..., vfN are flags, for example, showing a True state and a False state. The True state means that the verification has worked and the False state means the opposite. According to one embodiment, the secret data sVo, ..., sVN is used as a decryption key by the function 105, 205-1, ..., 205-N. The device V decrypts the data Ro, ..., RN with the secret data sVo, ..., sVN, and then checks whether it conforms to the expected data. According to another example, the functions 105, 205-1, ..., 205-N do not require decryption of the data Ro, ..., RN.

According to one example of implementation, the secret data sVi, respectively sPi, are all dependent on the secret data sVo, ..., sVi−1, respectively on the secret data sPo, ..., sPi−1 generated in the preceding operations VPo, ..., VPi−1. Thus, the result of the functions 205-1, ..., 205-N always depend on the previous verification operations, and an electronic device that would manage to evade one or more verification operations would not be able to carry out the following verification operations.

According to one example of implementation, at least one of the functions 103, 203-1, ..., 203-N is different from the others, and preferably, the functions 103, 203-1, ..., 203-N are all different from each other. Similarly, at least one of the functions 104, 204-1, ..., 204-N is different from the others, and preferably the functions 104, 204-1, ..., 204-N are all different from each other. Similarly, at least one of the functions 105, 205-1, ..., 205-N is different from the others, and preferably the functions 105, 205-1, ..., 205-N are all different from each other.

One advantage of this embodiment is that it makes the authentication method more complex and thus more difficult to copy.

Another advantage of this embodiment is that it also reduces the exposure of secret data of subsequent verification operations, if the device P (or V) participating in the exchange is not authentic.

Figure 5:
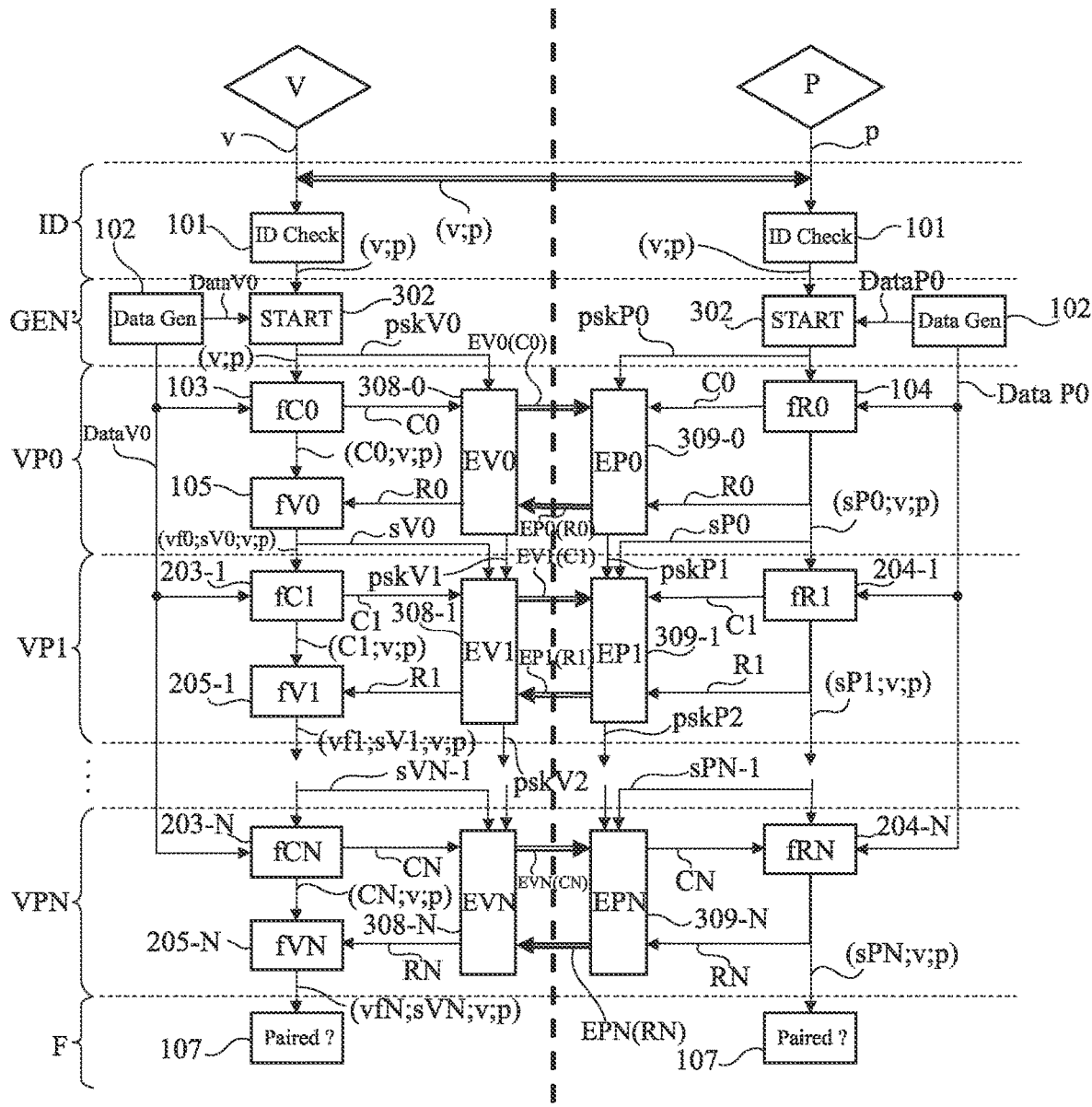
FIG. 5 shows, schematically and in block form, another embodiment of an authentication method.

FIG. 5 illustrates, schematically and in block form, another embodiment of a device authentication method of the type of device 22 described in connection with FIG. 2 to an electronic device of the type of device 21 described in connection with FIG. 2.

The method of FIG. 5 contains elements in common with the method described in connection with FIG. 4. The common elements are not described again, and only the differences between the methods in FIGS. 4 and 5 are highlighted.

The method in FIG. 5 differs from the method in FIG. 4 in that, during implementation of the verification operations VPo, ..., VPN, all data exchanges between the devices V and P are carried out in an encrypted manner. In FIG. 5, all data exchanges of the verification operations VPo, ..., VPN are carried out in an encrypted manner, but, in a variant, at least one verification operation VPi has its data exchanges carried out in an encrypted manner. Thus each operation VPi, for i varying from 0 to N, comprises the following successive steps: the device V implements the function 103 or 203-i to generate the data Ci; the device V sends the data Ci to the device P in encrypted form as described below; the device V implements the function 104 or 204-i to generate the data Ri and the secret data sPi; the device P sends the data Ri to the device V in an encrypted manner as described below; and the device V implements the function 105 or 205-i to generate the result data vii and the secret data sVi.

To exchange data in an encrypted manner, the device V implements the encryption and decryption functions 308-i ("EVi" block), and the device P implements the encryption and decryption functions 309-i ("EVi" block).

The functions 308-i use an encryption and decryption key pskVi, and are adapted to: encrypt the data Ci for sending it to the device P by using the pskVi key as the encryption key; the encrypted data Ci is denoted EVi(Ci); and decrypt the data sent by the device P, using the key pskVi as the decryption key.

Similarly, the functions 309-i use a pskPi encryption and decryption key, and are adapted to: decrypt the data sent by the device V, using the pskPi key as the decryption key; and encrypt the data Ri for sending it to the device V, using the key pskPi as the encryption key; the encrypted data Ri is denoted EPi(Ri).

The functions 308-i, the functions 309-i respectively, are further adapted to provide the encryption and decryption key pskVi+1, the encryption and decryption key pskPi+1 respectively, used in the following verification operation VPi+1. According to one preferred embodiment, the functions 308-i, the functions 309-i respectively, generate the encryption and decryption key pskVi+1, the encryption and decryption key pskPi+1 respectively, using the encryption and decryption key pskVi, the encryption and decryption key pskPi respectively. Thus, all encryption and decryption keys pskVo, ..., pskVN, encryption and decryption keys pskPo, ..., pskPN respectively, are dependent on each other.

According to one exemplary embodiment, the encryption functions 308-i and 309-i implement a symmetric encryption algorithm, in which the encryption key is identical to the decryption key. In this case, if the devices V and P are adapted to communicate with each other, then the keys pskVi and pskPi are therefore identical for each implementation of a verification operation VPi.

According to one alternative embodiment, the encryption functions 308-i and 309-i implement an asymmetric encryption algorithm, in which the encryption key is different from the decryption key. In this case, the keys pskVi and pskPi are therefore different for each implementation of a verification operation VPi.

The method in FIG. 5 further differs from the method in FIG. 4 in that its identification operation Id is followed by a GEN' operation similar to the GEN operation described in connection with FIGS. 3 and 4. As during the GEN operation, during the GEN' operation, the devices V and P use the same function 102 ("Data Gen" block) to generate the data DataVo and the data DataPo respectively. However, during the GEN' operation, the devices V and P, independently of each other, also implement a function 302 ("START" block) for generating the encryption and decryption keys pskVo and pskPo. The function 302 takes as input the data DataVo, the data DataPo respectively, and, operationally, the identification data v and p, and provides as output the key pskVo, the key pskPo respectively.

One advantage of this embodiment is that it protects the data exchanged by the devices V and P. A device that could intercept this data will not be able to implement the method without also having access to the encryption and decryption keys that are never exchanged.

Another advantage of this embodiment is that it also reduces the exposure of the secret data exchanged or generated in the VPi operation to a device that would not have performed the previous VPo, VP1, ..., VPi−1 operations.

Figure 6:
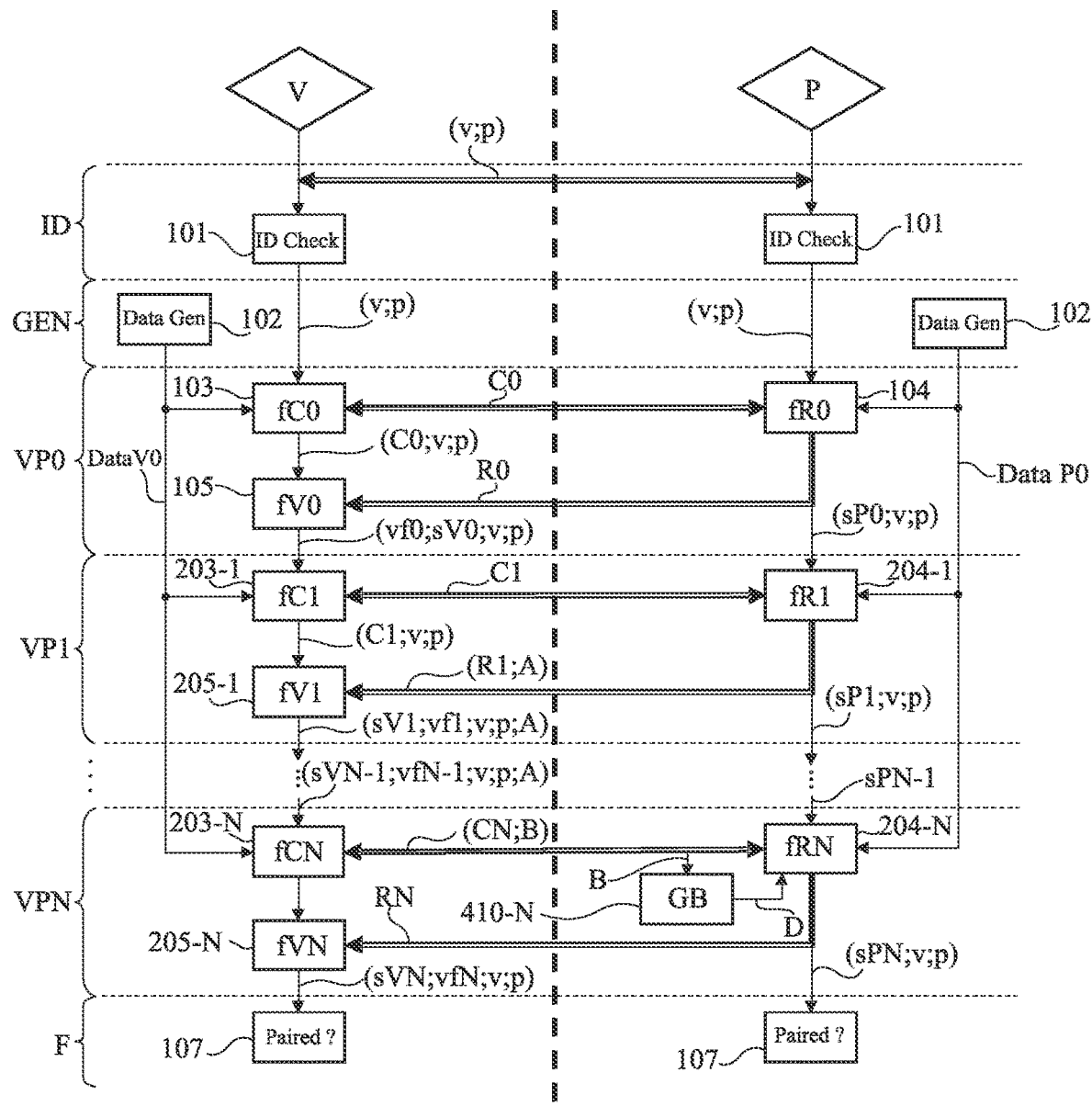
FIG. 6 shows, schematically and in block form, another embodiment of an authentication method.

FIG. 6 illustrates, schematically and in block form, another embodiment of a method for authenticating a device of the type of the device 22 described in relation to FIG. 2 with an electronic device of the type of the device 21 described in relation to FIG. 2.

The method of FIG. 6 contains elements in common with the method described in connection with FIG. 4. The common elements are not described again, and only the differences between the methods in FIGS. 4, and 6 are highlighted.

The method in FIG. 6 differs from the method in FIG. 4 in that, of the N+1 verification operations VPo, . . . , VPN, at least one pair of verification operations are linked. In FIG. 6, the operations VP1 and VPN are considered to form a pair of linked verification operations, but the person skilled in the art will know how to adapt the embodiment described to another pair of linked verification operations. Further, one embodiment of an authentication method may comprise more than one pair of linked verification operations. It is further noted that the method described in connection with FIG. 6 is compatible with the method described in connection with FIG. 5, but they have not been combined so as to not impair the clarity of FIG. 6.

As previously discussed, in the authentication method of FIG. 6, the verification operations VP1 and VPN are linked. More particularly, during implementation of the verification operation VP1, data A is generated by the device P and is then stored in the device V to be used only for the VPN authentication operation.

More precisely, during implementation of the verification operation VP1, the function 304-1 (block "fR1") of the device P is adapted to generate not only the data Ri and secret data sP1, but also to generate data A. Data A is then sent to the device V at the same time as the data R1. The device V stores the data A. In the verification operation VPN, the function 203-N (block "fCN") takes as input the data DataVo, optionally the identification information v and p, the secret data sVN-1, and the data A, to provide as output the data CN and data B. The data CN and B are sent to the device P. The device P is adapted to implement a function 410-N ("GB" block), taking as input the data B to provide data D as output, used by the function 204-N. According to one example, the function 410-N is an encryption function using the data B to decrypt the data D.

According to one alternative embodiment not shown, the data A may be generated by another function implemented by the device P. The data B may be generated by another function implemented by the device V.

One advantage of this embodiment is that it prevents a device that can evade one or more verification operations from implementing the authentication method.

Figure 7:
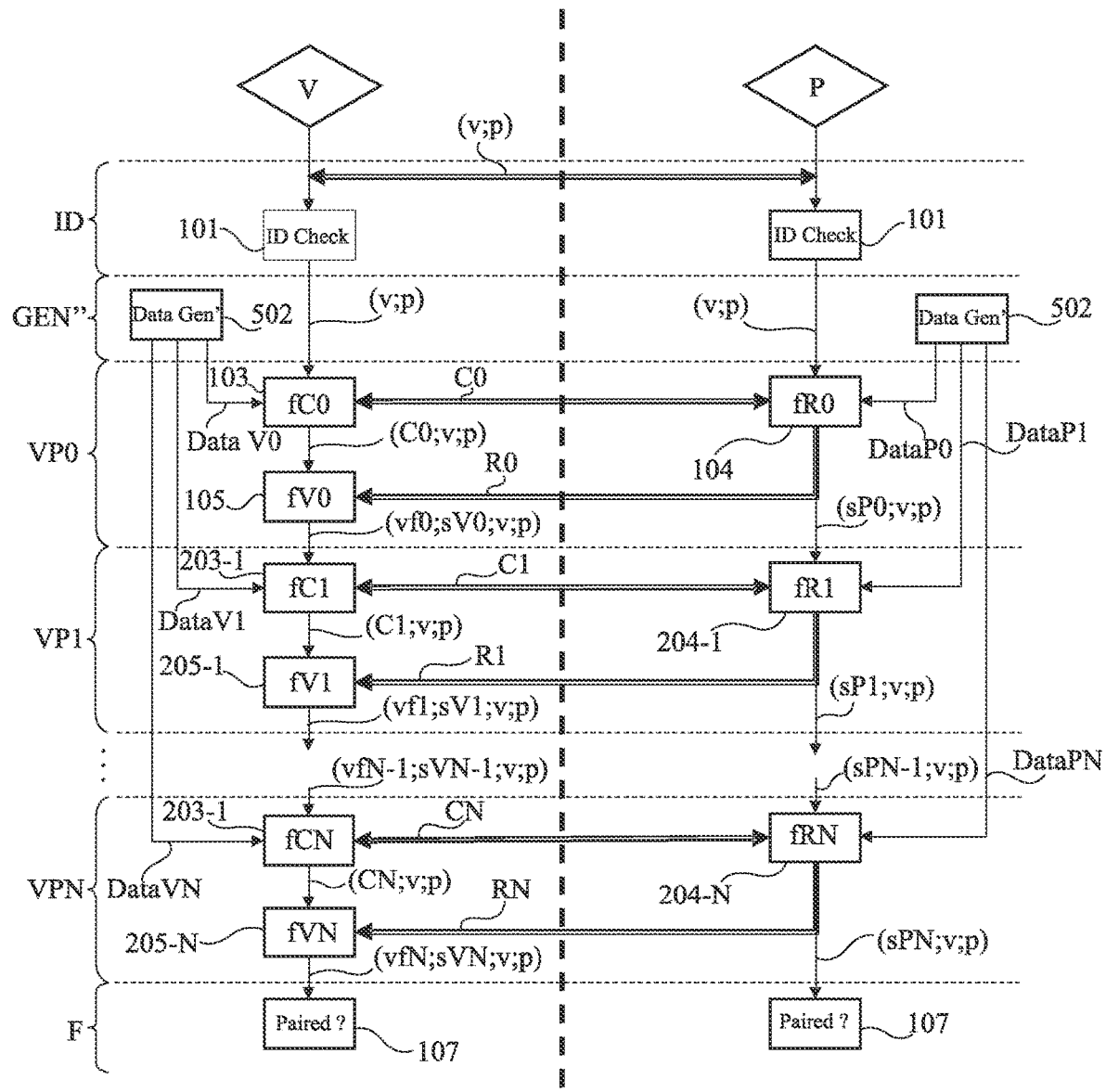
FIG. 7 shows, schematically and in block form, another embodiment of an authentication method.

FIG. 7 illustrates, schematically and in block form, another embodiment of a method for authenticating a device of the type of device 22 described in connection with FIG. 2 with an electronic device of the type of device 21 described in connection with FIG. 2.

The method of FIG. 7 contains elements in common with the method described in connection with FIG. 4. The common elements are not described again, and only the differences between the methods in FIGS. 4 and 7 are highlighted.

The method of FIG. 7 differs from the method of FIG. 4 in that the GEN operation described in connection with FIG. 4 is replaced by a GEN''' operation, during which the devices V and P implement a function 502 ("Data Gen'''" block). The function 502 is similar to the function 102 but differs in that the function 502 is adapted to provide as much data DataVi and DataPi, i varying from 0 to N respectively, as verification operations implemented in the authentication method. The devices V and P do not communicate with each other to generate the data DataVi and DataPi. According to one embodiment, if the devices V and P are intended to communicate with each other, then they are adapted to generate data DataVi that is identical or affiliated with the data DataPi. The function 502 may be a function for searching for data DataVo, . . . , DataVN, and DataPo, . . . , DataPN in the memory spaces of the devices V and P, such as the secure memory spaces of the devices V and P.

Thus, each function 103, 203-*o*, . . . , 203-N is adapted to receive the data DataVo, . . . , DataVN respectively, and each function 104, 204-*o*, . . . , 204-N is adapted to receive the data DataPo, . . . , DataPN respectively.

It is further noted that the method described in connection with FIG. 7 is compatible with the methods described in connection with FIGS. 5 and 6, but they have not been combined, so as not to impair the clarity of FIG. 7.

An advantage of this embodiment of the authentication method is that the use of different data DataVi and DataPi at each verification operation makes copying this authentication method more difficult for an electronic device that is not adapted to implement it.

Various embodiments and variants have been described. Those skilled in the art will understand that certain features of these embodiments can be combined and other variants will readily occur to those skilled in the art. The embodiments of FIGS. 4 through 7 may all be combined with each another. In particular, one preferred embodiment of an authentication method comprising a combination of all of these methods is covered in this description.

Further, the present description also relates to devices comprising memories storing sets of data for simulating the implementation of the methods described in connection with FIGS. 4 to 7. More particularly, these devices may include data sets showing at least the following data:

the data Co, . . . , CN;
the data Ro, . . . , RN;
the secret data sVo, . . . , sVN;
the secret data sPo, . . . , sPN; and
the information vfo, . . . , vfN.

These data sets may further include data showing the encryption and decryption keys pskVo, . . . , pskVN, and pskPo, . . . , pskPN, or the encrypted data EVo(Co), . . . , EVN(CN), and EPo(Ro), . . . , EPN(RN).

Finally, the practical implementation of the embodiments and variants described herein is within the capabilities of those skilled in the art based on the functional description provided hereinabove.

What is claimed is:

1. An authentication method of a prover device to a verifier device, the method comprising:
   at least two successive verification operations, each operation comprising, successively:
      generating, by the verifier device, first data from second data generated by the verifier device in a preceding verification operation;
      sending, by the verifier device, the first data to the prover device;
      generating, by the prover device, third data and fourth data used by a following verification operation, by applying a first function taking as input at least the first data and the fourth data generated in the preceding verification operation;
      sending, by the prover device, the third data to the verifier device;
      verifying, by the verifier device, the third data using a second function taking as input the first data and the third data; and outputting, by the verifier device, information indicating whether the verification was successful, and the second data used by the following verification operation; and authenticating the prover device to the verifier device in response to:
for each verification operation, the information indicating that the verification was successful; and
the fourth data of the prover device and the second data of the verifier device of a last verification operation being correct.

2. The method according to claim 1, wherein, during implementation of a first verification operation, the verifier device uses fifth data to generate the first data, and the prover device uses sixth data to generate the third data and the fourth data.

3. The method according to claim 2, wherein the fifth data is different for each verification operation, and the sixth data is different for each verification operation.

4. The method according to claim 2, wherein, during implementation of each verification operation, the verifier device uses the fifth data to generate the first data, and the prover device uses the sixth data to generate the third data and the fourth data.

5. The method according to claim 2, wherein the verifier device generates the first data from the second data generated in the preceding verification operation and the fifth data, and the first function takes as input the first data, the fourth data generated in the preceding verification operation, and the sixth data.

6. The method according to claim 1, further comprising an identification operation preceding the at least two successive verification operations, the identification operation comprising:
the prover and verifier devices exchanging identification numbers; and
in response to at least one of the devices not recognizing the identification number of the other device, implementing the at least two successive verification operations.

7. The method according to claim 1, wherein the first function of one of the at least two successive verification operations is different from the first function of another one of the at least two successive verification operations.

8. The method according to claim 1, wherein the second function of the at least two successive verification operations is different from the second function of another of the at least two successive verification operations.

9. The method according to claim 1, wherein the prover and verifier devices send data to each other in an encrypted manner.

10. The method according to claim 9, wherein, during implementation of each of the at least two successive verification operations, the prover and verifier devices send the data to each other in the encrypted manner using a first encryption key.

11. The method according to claim 10, wherein the first encryption key is different for each implementation of each of the at least two successive verification operations.

12. The method according to claim 11, wherein the first encryption key depends on the first encryption key of the preceding verification operation.

13. The method according to claim 1, wherein, of the at least two successive verification operations, there is at least a first verification operation in which the second function generates seventh data, in addition, which is sent to the verifier device, and of the at least two successive verification operations there is at least one second verification operation, successive to the first verification operation, wherein:
the verifier device further generates eighth data by applying the first function to the seventh data and sends the eighth data to the prover device; and
the prover device decrypts ninth data using the eighth data to generate the third data.

14. The method according to claim 13, wherein the prover device uses the eighth data to decrypt ninth data, and the first function further takes the ninth data as input to generate the third data.

15. A prover device comprising:
a non-transitory memory comprising instructions; and
a processor in communication with the non-transitory memory, wherein the processor executes the instructions to authenticate the prover device to a verifier device, the authentication comprising:
at least two successive verification operations, each operation comprising, successively:
receiving first data from the verifier device, the first data generated by the verifier device from second data generated by the verifier device in a preceding verification operation;
generating third data and fourth data used by a following verification operation, by applying a first function taking as input at least the first data and the fourth data generated in the preceding verification operation; and
sending the third data to the verifier device for verification using a second function taking as input the first data and the third data; and
verifying the prover device to authorized to communicate with the verifier device in response to the fourth data of the prover device of a last verification operation being correct.

16. The prover device according to claim 15, wherein the non-transitory memory is configured to store the first, third, and fourth data.

17. The prover device according to claim 15, wherein the authentication further comprises an identification operation preceding the at least two successive verification operations, the identification operation comprising:
exchanging identification numbers with the verifier device; and
in response to at least one of the devices not recognizing the identification number of the other device, implementing the at least two successive verification operations.

18. A verifier device comprising:
a non-transitory memory comprising instructions; and
a processor in communication with the non-transitory memory, wherein the processor executes the instructions to authenticate a prover device to the verifier device, the authentication comprising:
at least two successive verification operations, each operation comprising, successively:
generating first data from second data generated by the verifier device in a preceding verification operation;
sending the first data to the prover device;
receiving third data from the prover device, the third data and fourth data used by a following verification operation generated by the prover device by applying a first function taking as input at least the first data and the fourth data generated in the preceding verification operation;

verifying the third data using a second function taking as input the first data and the third data; and outputting information indicating whether the verification was successful, and the second data used by the following verification operation; and verifying the prover device to authorized to communicate with the verifier device in response to:

for each verification operation, the information indicating that the verification was successful; and the second data of the verifier device of a last verification operation being correct.

19. The verifier device according to claim 18, wherein the non-transitory memory is configured to store the first, second, and fourth data and the information.

20. The verifier device according to claim 18, wherein the authentication further comprises an identification operation preceding the at least two successive verification operations, the identification operation comprising:

exchanging identification numbers with the prover device; and in response to at least one of the devices not recognizing the identification number of the other device, implementing the at least two successive verification operations.

\* \* \* \* \*